United States Patent [19]

Yokota et al.

[11] 4,335,409
[45] Jun. 15, 1982

[54] TAPE PACK EJECTING MECHANISM FOR TAPE PLAYER

[75] Inventors: Tadashi Yokota; Wataru Watanabe; Makoto Kondo, all of Toda, Japan

[73] Assignee: Clarion Co., Ltd., Tokyo, Japan

[21] Appl. No.: 123,197

[22] Filed: Feb. 21, 1980

[30] Foreign Application Priority Data

Feb. 26, 1979 [JP] Japan .................................. 54-020765

[51] Int. Cl.³ .......................... G11B 15/66; G11B 5/78
[52] U.S. Cl. .................................... 360/96.6; 242/198
[58] Field of Search .......................... 360/96.5, 96.6; 242/198

[56] References Cited

U.S. PATENT DOCUMENTS

| | | | |
|---|---|---|---|
| Re. 28,092 | 7/1974 | Righi | 360/96.5 |
| 3,623,678 | 11/1971 | Housman et al. | 360/96.6 |
| 3,902,681 | 9/1975 | Boehme | 360/96.6 |

*Primary Examiner*—Stuart N. Hecker
*Attorney, Agent, or Firm*—Wallenstein, Wagner, Hattis, Strampel & Aubel

[57] ABSTRACT

A tape pack ejecting mechanism wherein a tape pack is loaded and unloaded into and from a pack receiving structure pivotally connected at one end portion thereof to a chassis so as to allow pivotal movement thereof, locking of the pack receiving structure in a tilted position is released by loading of the tape pack, bringing the tape pack into a horizontal playback position, and the pack receiving structure is again tilted through rotation of an engaging member upon depressing of an eject lever to eject the tape pack, which mechanism is characterized by a guide provided at one side portion of the pack receiving structure for guiding the loading and unloading of the tape pack; and eject operating member with a tension spring attached thereto which is slidably provided on the guide; said eject operating member having a hanging portion engageable with a rear end of the tape pack and a projection engageable with a lock portion formed on the engaging member; said tension spring being biased to urge when the tape pack is loaded into a playback mode; said engaging member being reset by the rebounding force of the urged spring to eject the tape pack through the operation of the engaging member rotated upon eject operation by the eject lever.

5 Claims, 4 Drawing Figures

TAPE PACK EJECTING MECHANISM FOR TAPE PLAYER

BACKGROUND OF THE INVENTION

1. Field of the Invention

This invention relates to a tape pack ejecting mechanism for a tape player, and more particularly to a tape pack ejecting mechanism suitable for a thin-type tape player, which is capable of facilitating handling of a tape pack, especially unloading of the tape pack from the tape recorder.

2. Description of the Prior Art

In a tape player, such as a car tape player, adapted to load and unload a tape pack through an opening of the tape player formed at the front thereof, it has been difficult to make it as compact and thin in a vertical direction as theoretically desired a two-reel type tape pack, i.e., a so-called cassette-type tape pack, prevails today. To load and unload such a cassette-type tape pack into a tape player, it is necessary to engage reel drive members and a capstan with the tape pack inserted in a horizontal direction. For this reason, either the inserted tape pack must be lowered and raised or the deck on which the reel drive members are mounted, must be raised and lowered to engage the reel drive members and capstan with the pack. In either case, the distance and area of the movement of the lowering and lifting operation are considerably large, and therefore the operating mechanism and the entire structure of the tape player inevitably become large, especially in their vertical thickness. To obviate such disadvantages and to make the player more compact and thin, it has been proposed to insert the tape pack in a diagonal position and bring the tape pack inserted in the diagonal position into a horizontal position at the last stage of the tape pack insertion so as to engage the reel drive members with the tape pack. In accordance with this method, since the entire tape pack is not subjected to the up and down movement but only one end portion thereof is lifted and lowered, the amount and area of the movement is greatly reduced. A mechanism for carrying out such an operation, may include a pivotal means for accommodating such pivotal movement of the inserted tape pack. Thus, the entire mechanism of the tape player is simplified and the vertical thickness thereof is reduced. However, in such a tape player where the tape pack is inserted in a diagonal position, it is difficult to accomplish desired ejection of the tape pack in the eject operation of the tape pack due to such a diagonal loading and unloading arrangement. The known mechanisms for this purpose effect release of a lock lever from a pack receiving structure locked in a tilted or slanting position by a light push back of the tape pack by components interlocked with such release operation. Such light push back of the tape pack is not sufficient to easily take out the tape pack from the tape player.

OBJECT OF THE INVENTION

The invention has been achieved to obviate the above-mentioned disadvantages involved in the known mechanism. It is, therefore, an object of the present invention to provide a tape pack ejection mechanism for a tape player having a compact and thin structure, and which is capable of facilitating easy and reliable handling of the tape pack.

SUMMARY OF THE INVENTION

In accordance with the present invention, there is provided a tape pack ejecting mechanism which comprises:

a chassis;

a tape pack receiving structure pivotally connected to said chassis so as to be tiltable thereto;

an eject lever provided on said chassis;

an engaging member pivotally connected to said chassis and adapted to engage with said eject lever;

a guide member provided on said tape pack receiving structure for guiding a tape pack to be loaded and unloaded;

an eject-operating member slidably provided on said guide member; and an ejecting spring anchored to said eject operating member;

said eject-operating member having a portion adapted to engage with a rear end of the tape pack when the tape pack is inserted into the tape pack receiving structure and a portion adapted to engage with said engaging member;

said ejecting spring being adapted to be stretched according to the insertion of said tape pack in the tape pack receiving structure;

said engaging member being adapted to be rotated through engagement with the eject lever to tilt said tape pack receiving structure and to let the stretched spring recover its original position, resetting said eject-operating member and ejecting said tape pack.

BRIEF DESCRIPTION OF THE DRAWINGS

FIG. 3 is a similar side elevational view of the tape player in its playback position.

DESCRIPTION OF THE PREFERRED EMBODIMENT

Figure 1:
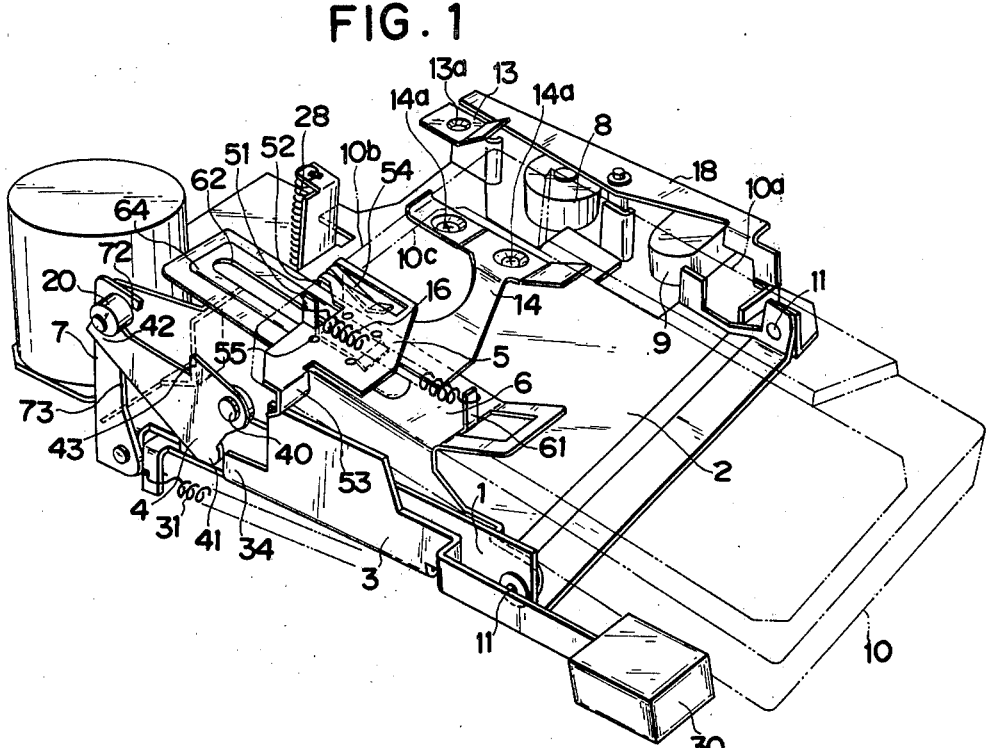
FIG. 1 is a perspective view of a tape player equipped with a tape pack ejecting mechanism in accordance with the present invention, showing it in an ejected position.
Figure 3:
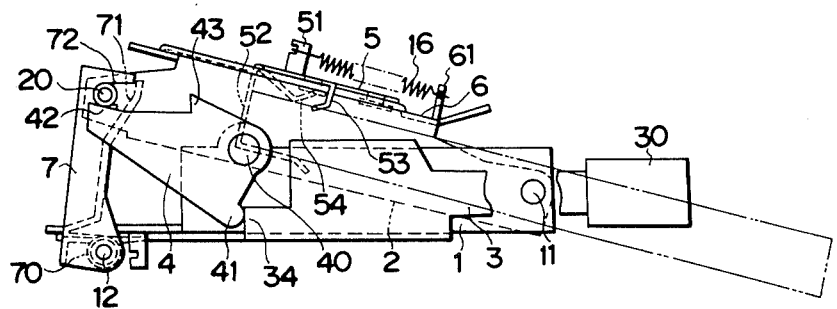
FIG. 3 is a side elevational view of the tape player in its ejected position.
Figure 4:
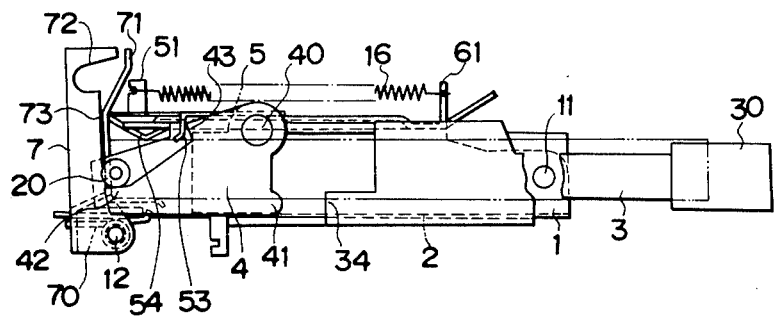

The invention will now be described in detail referring to an embodiment illustrated in the accompanying drawings. A tape pack receiving structure 2 is mounted on a chassis 1 by pivots 11 and 11 at forward, opposite side ends of a tape player. An eject lever 3 is provided at a side portion of the chassis 1 and adapted to accomplish an eject operation when depressed rearwardly. A mechanism for carrying out the eject operation comprises an engaging member 4 pivotally connected at 40 to an intermediate portion of the chassis 1. The engaging member 4 has a receiving portion 41 engageable with an engaging portion 34 of the eject lever 3 and an engaging portion 42 provided oppositely to the receiving portion 41 for engaging with a roller 20 provided at a rear end of the pack receiving structure 2. The engaging member 4 further has, on an upper side thereof between the pivotal point 40 and the engaging portion 42, a lock portion 43 engageable with a projection 53 formed at a side portion of an eject-operating member 5. The eject-operating member 5 is mounted on a guide 6 which is provided at one side portion of the pack receiving structure 2 so as to slide by engaging members 50 and 50 on the member 5. A tension spring 16 is provided between a spring rest 51 formed at a rear end portion of the eject-operating member 5 and a spring rest 61 formed at a forward end portion of the guide 6. The eject-operating member 5 further has a hanging portion 52 at a rear end thereof, which is engageable with a rear end of a tape pack 10 and adapted to be pushed rearwardly against the action of the spring 16 when the tape pack 10 put in the pack receiving structure 2 is depressed rearwardly. A pressing portion 54 is further provided on the eject-operating member 5 as illustrated in FIG. 1, for pressing an upper face of the pack 10 inserted in the pack receiving structure 2. A lock member 7 is rotatably mounted by a transverse shaft 12 at a rear, lower portion of the chassis 1. The lock member 7 has a receiving projection 71 formed at an intermediate portion thereof. A spring 70 is wound around the transverse shaft 12 as depicted in FIGS. 3 and 4 on the lock member 7 so as to normally stand the lock member 7 upright. The lock member 7 further has, at an upper portion thereof, a recessed portion 72 which is adapted to lock a shaft 27 of the roller 20 on the pack receiving structure 2 in a slanting position as shown in FIGS. 1 and 3 and, at a portion lower than the recessed portion 72, an engaging edge 73 adapted to abut on the shaft 27.

A spring 31 is provided between the eject lever 3 and a bottom face of the chassis 1 as illustrated in FIG. 1. An operating button 30 of the eject operating lever 3 is adapted to be depressed against the action of the spring 31 and restored to its original position when released. At another side portion of the chassis 1, there is provided an operating sturcture 18 for operating a pinch roller 8 and a head 9 so as to advance and retreat relative to the tape pack 10. Thus, when the tape pack 10 is set in a predetermined playback position, the pinch roller 8 and the head 9 is advanced to a playback face 10a of the tape pack 10 after detection of the pack 10.

In the embodiment illustrated, the eject operating member 5 has small projections 55 extending towards the guide 6 on opposite sides of the engaging members 50 and 50, respectively. On the guide 6, there is formed a protuberance 64 at an intermediate portion of the guide 6 corresponding to the small projections 55, and a guide slot 62 at the central portion of the protuberance extending in a longitudinal direction thereof, for receiving the engaging members 50 and 50 therein. Since the small projections 55 abut and slide on the top face of the protuberance 64, a frictional resistance in the sliding operation is reduced very much and a smooth sliding operation can be achieved. A resilient member 14 is fixed to the guide 6 for pressing an intermediate portion of the pack 10 being loaded or unloaded, against the pack receiving structure 2, by its resilient force. Small projections 14a extending downwardly are formed at a pressing portion of the resilient member 14, which serve to assure positive pressing of the tape pack 10 against the structure 2 and reduce a frictional resistance relative to the face of the pack 10. Another guide member 13 is provided on the chassis 1 at a rear, side portion thereof for regulating the insertion of the tape pack 10 at a final stage of the insertion. This guide member 13 also has a downwardly extending small projection 13a to reduce a frictional resistance in relation with the tape pack 10.

In the so arranged tape pack ejecting mechanism according to the present invention, it will be seen that the tape pack receiving structure 2 is in a slanting position where the rear portion thereof is raised around the pivots 11 and 11 as illustrated in FIGS. 1 and 3 after completion of the eject operation. When the pack 10 is loaded diagonally into the tape pack receiving structure in the position, the rear end 10b engages with the hanging portion 52 of the eject operating member 5 to push it rearwardly, allowing the spring 16 to store a rebounding force for the eject operation. At a final stage of the retreat of the tape pack 10, the receiving projection 71 of the lock member 7 is pushed back against the action of the spring 70 and the lock member 7 is knocked out, releasing the lock of the shaft 27 by the recessed portion 72. Upon release of the locking, the tape pack receiving structure 2 falls onto the chassis 1 by the action of a suitable means such as a spring 28 provided between the chassis 1 and the tape pack receiving structure 2 and assumes a horizontal position as illustrated in FIG. 4. In the position, reel drive members etc. are fitted into the pack 10 to establish a playback mode.

Figure 2:
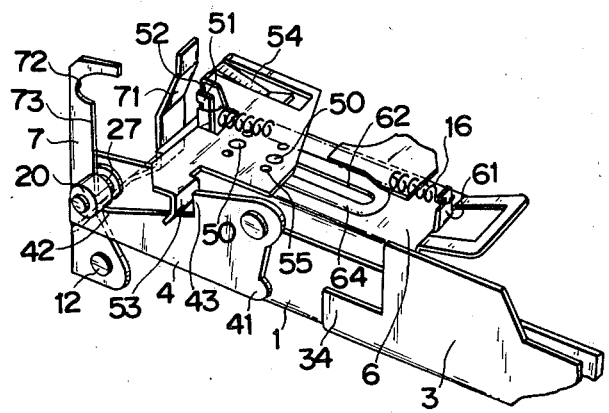
FIG. 2 is a fragmentary perspective view of the tape player illustrated in FIG. 1, showing it in a playback position.

On the other hand, when the eject lever 3 is depressed in the aforesaid playback mode, the engaging portion 34 of the lever 3 pushes the receiving portion 41 of the engaging member 4 to rotate the engaging member 4 clockwise as viewed in FIGS. 2 or 4. As a result, the engaging portion 42 of the engaging member 4 is raised to lift the rear end of the pack receiving structure 2 through the roller 20. The shaft 27 of the roller 20 is lifted to a position corresponding to the recessed portion 72 while the lock member 7 is rotated by the action of the spring 70 provided around the transverse shaft 12 to establish a locking state. Further upon rising of the forward end of the tape pack receiving structure 2 through the engaging member 4, the projection 53 of the eject-operating member 5 locked by the lock portion 43 of the engaging member 4 is released. Then, the eject operating member 5 is forced forwardly by the resetting force of the spring 16 and the pack 10 is caused to eject out of the pack receiving opening by the hanging portion 52. The pack 10 thus being subjected to the eject operation is engaged, at a step 10c formed at a peripheral portion of the pack 10, by the small projection 14a so that it can be held in a suitably projected position. The so projected pack 10 can be removed easily.

In accordance with the present invention, as mentioned above, due to employment of the pack receiving structure 2 pivotally connected to the chassis in the vicinity of the tape pack receiving entrance, there can be attained a desired loading and unloading operation of the tape pack 10 in a slanting manner. Thus, the tape player can be made compact and thin. Furthermore, since the tape pack ejecting mechanism of the present invention is so constructed that the eject-operating member 5 with the spring is slidably mounted on the guide formed on the tape pack receiving structure 2, the spring of the eject-operating member 5 is biased to store a rebounding force when the tape pack 10 is inserted, the tape pack receiving structure set in the playback position is raised by the operation of the engaging member 4 and the eject-operating member 5 locked to the engaging member 4 is released to project the pack 10 when the eject lever 3 is depressed, the structure of the eject operating mechanism can be simplified by the employment of the engaging member 4 and the mechanism can be compact and thin with all such desired ejection operation as mentioned above, due to employment of the thin eject-operating mechanism 5 which is just attached to the guide 6.

We claim:

1. A tape pack ejecting mechanism which comprises: a chassis; a tape pack receiving structure pivotally connected to said chassis so as to be tiltable thereto; a manually operable eject lever provided on said chassis; an engaging member pivotally connected to said chassis and adapted to engage with said eject lever; a guide member provided on said tape pack receiving structure for guiding a tape pack to be loaded and unloaded; an eject-operating member slidably mounted on said guide member for movement by insertion of the tape pack on said structure; and an ejecting spring anchored to said eject-operating member to urge the same into a tape pack ejecting position; said eject-operating member having a portion adapted to be stretched according to the insertion of said tape pack in the tape pack receiving structure; said engaging member being adapted to be rotated through engagement with the eject lever to tilt said tape pack receiving structure and to let the stretched spring recover its original position, resetting said eject-operating member and ejecting said tape pack.

2. A tape pack ejecting mechanism as claimed in claim 1, which further comprises a lock member adapted to engage with said engaging member when said member is rotated for locking said engaging member.

3. A tape pack ejecting mechanism as claimed in claim 1, wherein said guide member has a guide slot and a protuberance formed around said slot and said eject-operating member is adapted to slide along said protuberance while engaging with said guide slot.

4. A tape pack ejecting mechanism as claimed in claim 1, wherein said tape pack receiving structure has a resilient member for pressing an intermediate portion of the tape pack.

5. A tape pack ejecting mechanism as claimed in claim 2, which further comprises a spring which normally acts to stand said lock member upright, but is adapted to be knocked down to release said engaging member when the tape pack is inserted.

* * * * *